US007458094B2

(12) United States Patent
Jackson

(10) Patent No.: US 7,458,094 B2
(45) Date of Patent: Nov. 25, 2008

(54) INTRUSION PREVENTION SYSTEM

(75) Inventor: Gary Manuel Jackson, Gambrills, MD (US)

(73) Assignee: Science Applications International Corporation, San Diego, CA (US)

( * ) Notice: Subject to any disclaimer, the term of this patent is extended or adjusted under 35 U.S.C. 154(b) by 465 days.

(21) Appl. No.: 09/874,292

(22) Filed: Jun. 6, 2001

(65) Prior Publication Data

US 2002/0188864 A1   Dec. 12, 2002

(51) Int. Cl.
*G06F 17/30* (2006.01)
*G06F 12/14* (2006.01)
*H04L 9/00* (2006.01)

(52) U.S. Cl. ............ 726/2; 726/1; 726/3; 726/11; 726/13; 726/22; 726/23; 726/25; 713/154; 709/223; 709/226; 709/229

(58) Field of Classification Search ......... 713/200–201, 713/154; 709/223–229; 726/1–3, 11, 13, 726/22–23, 25
See application file for complete search history.

(56) References Cited

U.S. PATENT DOCUMENTS

| 5,155,801 | A |   | 10/1992 | Lincoln .................... 395/22 |
|-----------|---|---|---------|-----------------------------------|
| 5,311,593 | A |   | 5/1994  | Carmi ...................... 380/23 |
| 5,559,833 | A | * | 9/1996  | Hayet ..................... 375/259 |
| 5,559,883 | A |   | 9/1996  | Williams .................... 380/4 |
| 5,991,881 | A | * | 11/1999 | Conklin et al. ............ 713/201 |
| 6,134,664 | A | * | 10/2000 | Walker ....................... 726/22 |
| 6,324,656 | B1 | * | 11/2001 | Gleichauf et al. ........... 714/37 |
| 6,405,318 | B1 | * | 6/2002  | Rowland .................. 713/200 |
| 6,519,703 | B1 | * | 2/2003  | Joyce ...................... 713/201 |
| 6,597,660 | B1 | * | 7/2003  | Rueda et al. ............ 370/230.1 |
| 6,647,400 | B1 | * | 11/2003 | Moran ..................... 707/205 |
| 6,671,811 | B1 | * | 12/2003 | Diep et al. ................... 726/23 |
| 6,735,702 | B1 | * | 5/2004  | Yavatkar et al. ............. 726/13 |
| 6,769,066 | B1 | * | 7/2004  | Botros et al. ................ 726/23 |
| 6,839,850 | B1 | * | 1/2005  | Campbell et al. ........... 726/23 |
| 6,971,028 | B1 | * | 11/2005 | Lyle et al. ................... 726/3 |
| 2002/0083175 | A1 | * | 6/2002 | Afek et al. ................ 709/225 |
| 2002/0144156 | A1 | * | 10/2002 | Copeland, III ............ 713/201 |

OTHER PUBLICATIONS

Ghosh et al., Feb. 19, 1999, USENIX Technical Program-Paper-1st Workshop on Intrusion Detection and Network Monitoring, p. 1-15.*

* cited by examiner

*Primary Examiner*—Kristine Kincaid
*Assistant Examiner*—Jenise E Jackson
(74) *Attorney, Agent, or Firm*—King & Spalding LLP

(57) ABSTRACT

The invention provides a method and system for monitoring a computer network and determining whether the network faces a threat from users. In the event that the existence of a threat is determined, the system in accordance with the invention provides a real-time assessment of the threat to the network and responds to prevent damage to the network.

17 Claims, 5 Drawing Sheets

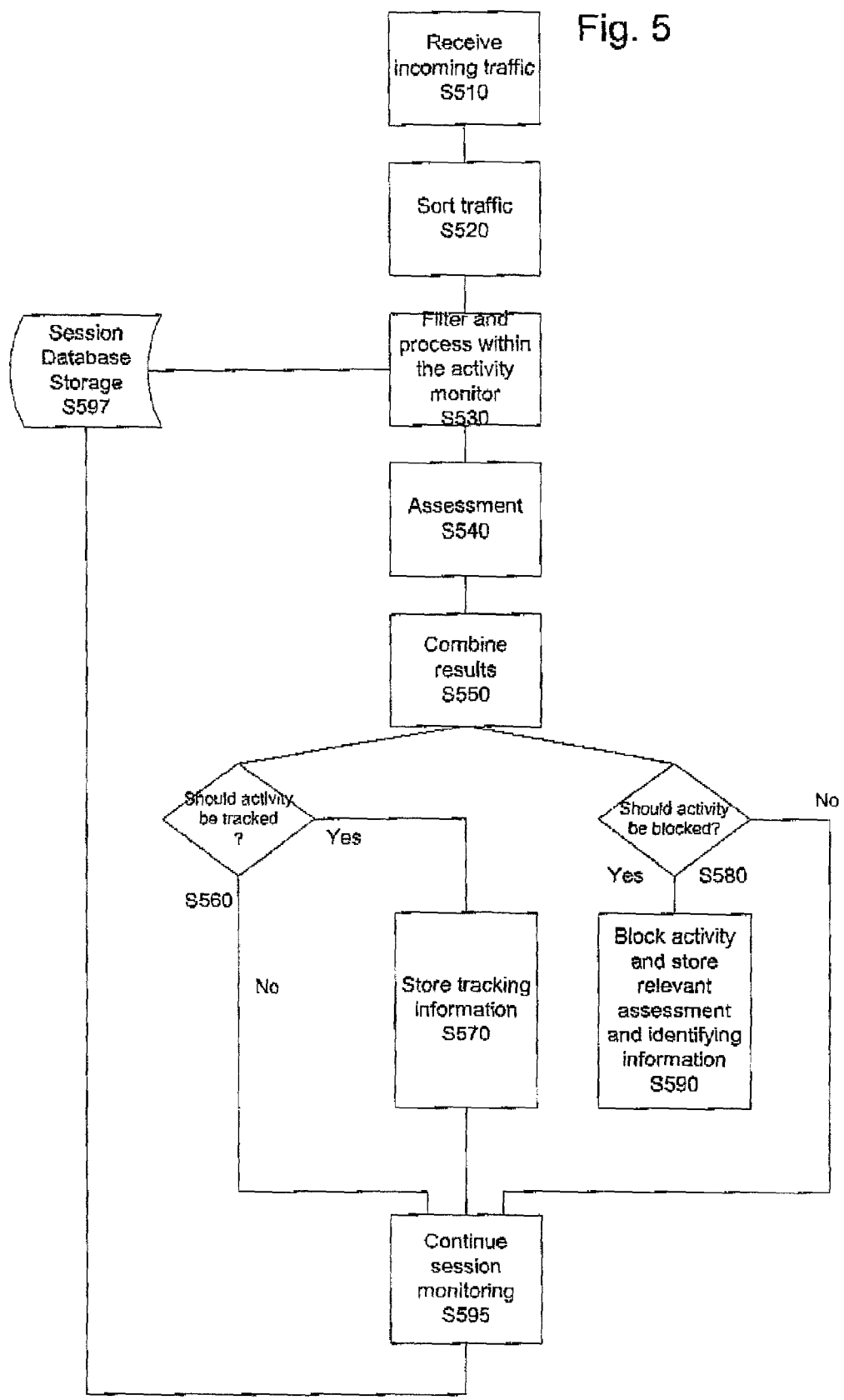

INTRUSION PREVENTION SYSTEM

BACKGROUND OF THE INVENTION

1. Field of the Invention

The invention relates to a computer network security system. More specifically, the invention provides a system and method allowing network access and proactively detecting and preventing unauthorized intrusion of the network based upon real-time assessment of behavior and intent.

2. Discussion of the Related Art

The development of network computing has allowed widely dispersed users to interact, communicate, and share resources via a computer network. The interconnected nature of networks makes them susceptible to intrusion by unauthorized users. Network intruders may range from innocent users who inadvertently gain access to information intended for delivery to another party to sophisticated and highly skilled intruders intending to access a secured site to inflict damage or perpetrate theft.

Conventional network intrusion detection systems can be divided into two different approaches: i.) pattern matching systems; and ii.) anomaly detection systems. Pattern matching systems operate by observing an intruder and looking for a set pattern based upon previous activity. Over time, through the observation of different intruders, a collection of patterns is compiled and may be used for broad-based detection of previously observed attacks. While this approach can provide broad protection against known or observed intrusion techniques, it does not protect against new intrusion techniques.

More recently, anomaly detection systems have been developed that generate statistical profiles of normal activity for a specific network or subnet. These profiles are usually generated via standard statistical methods or by self-adjusting neural networks that learn statistically "normal" responding on a network. If a user appears outside of the "norm," then a warning may be issued or the user may be blocked. Non-normal activity may include any activity not falling within previously identified activity that is deemed allowable. Unfortunately, authorized users, as well as others who present no threat of damage or theft, can exhibit "non-normal" activity and can have access blocked or terminated, as well as intended intruders. Furthermore, because these past activity profiles are developed for a specific network, they cannot be carried over and incorporated into other networks.

Both the conventional pattern matching and anomaly detection network security systems are based upon either capturing the past activity of intruders labeled as harmful or capturing the past activity of non-intrusion activity labeled as statistically normal. However, these systems are unable to proactively prevent intrusion damage created by first time attacks or even modifications of previous attacks. In general, the earlier an attack can be detected, the less overall damage it can cause to a victim.

SUMMARY OF THE INVENTION

As described above, conventional network security systems are reactive, whether based on pattern matching or anomaly detection methodologies, and do not provide effective protection against unknown and unfamiliar types of intrusions in an accurate manner (without raising the false positive and false negative rates). Thus, there is a need for a network security system that: proactively identifies network intruders; identifies unique first-time attacks based on attack modifications and traditional attacks; assists in identifying hackers by intent patterns who return to a site with a different source address; and responds to all attacks immediately to prevent further intrusion and damage.

Any system that is proactive and capable of identifying first time attacks must be able to anticipate that harmful activity is going to occur if actual damage is to be prevented. In other words, if a system is to be preventative in natures intrusive damage or theft can be prevented only by anticipating its occurrence quickly enough for preventative measures to be taken. The invention provides a system and method for proactively assessing behavioral characteristics of users to determine the intent to conduct unauthorized intrusions into or within a computer network and responding appropriately to prevent theft or damage.

According to one embodiment of the invention, the system simultaneously tracks all users who exhibit activity directed at priority-designated ports or services (i.e. e-mail or web traffic.) as they enter and navigate through the network, as well as across-port activity. The system then assesses specific behavior and activity repeatedly and in real-time. Once a target for assessment is identified, the system then determines whether the network user navigating through a site intends to cause damage or conduct theft or does not intend to behave as an intruder. The system is able to identify first-time attacks based on attack modifications in addition to more traditional known attacks. Finally, the system takes action when necessary to prevent intrusion damage.

Thus, it is an object of the invention to provide a network security system that proactively identifies network intruders.

It is another object of the invention to provide a network security system that identifies unique first time attacks based upon attack modifications and traditional attacks.

It is another object of the invention to provide a network security system that assists in the identification of hackers by intent patterns who return to a site with different source addresses.

It is a further object of the invention to provide a network security system that responds to all attacks immediately to prevent further intrusion and damage.

In accordance with the objects outlined above, the invention provides a method for detecting unauthorized intrusion in a network that includes the steps of receiving packet level activity information from the network, sorting port specific activity information from the received packet level activity information, monitoring the port specific activity information and executing at least one of a blocking action or a tracking action based upon the monitored port specific activity information.

The invention further provides a system for protecting against unauthorized intrusion in a network system that includes a traffic sorter, an activity monitor, an inter-port fusion module and outcome director.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention. In the drawings:

FIG. 5 is a flowchart illustrating the process for identifying and blocking or tracking network activity in accordance with an embodiment of the invention.

DETAILED DESCRIPTION OF THE PREFERRED EMBODIMENTS

Figure 1:
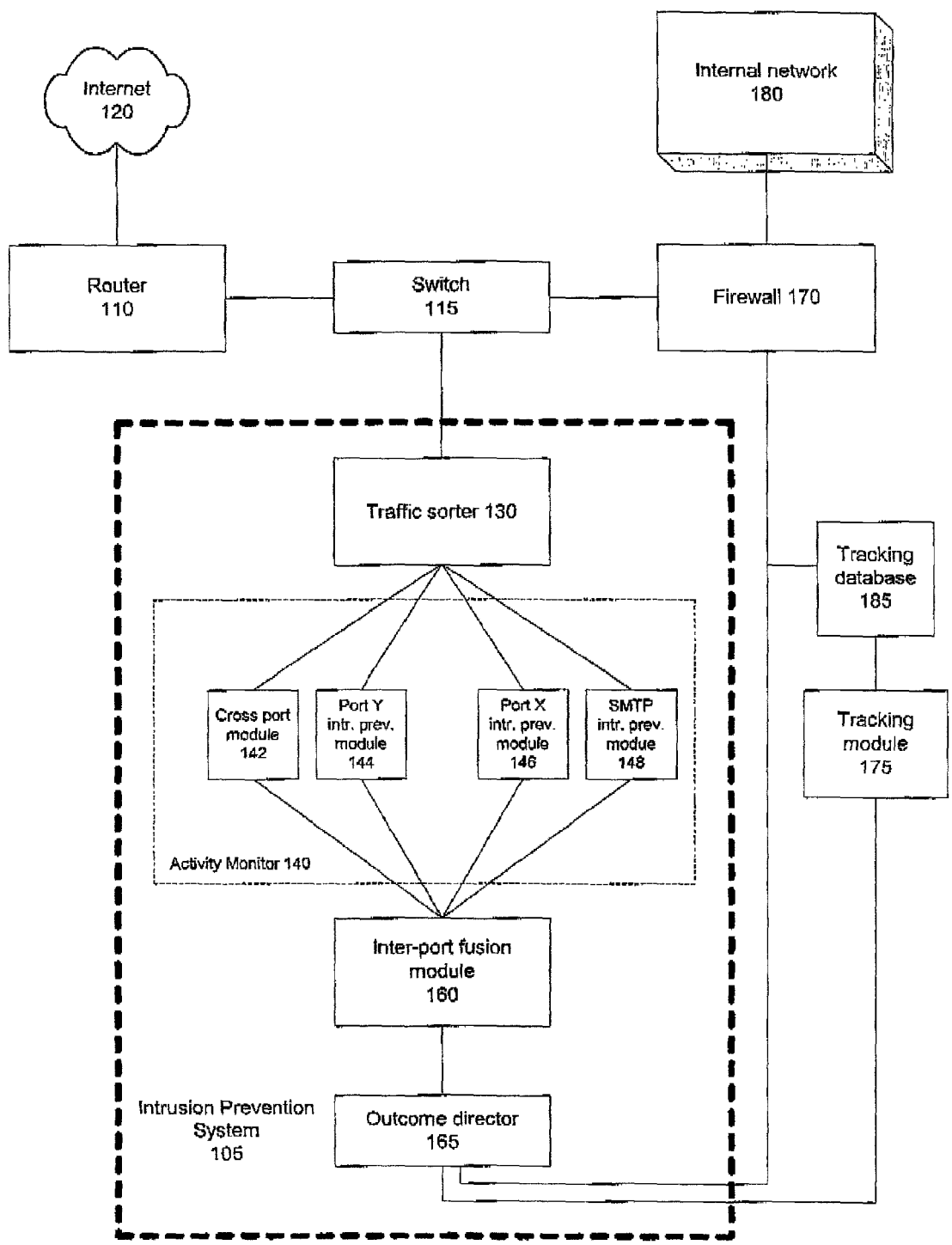
FIG. 1 is a block diagram of the intrusion prevention system in accordance with an embodiment of the invention.

Reference will now be made in detail to the preferred embodiments of the invention, examples of which are illustrated in the drawings.

FIG. 1 is a block diagram providing an overview of a computer network, including an intrusion detection and prevention system 105 according to the invention. FIG. 1 shows a computer network coupled to a communications network 120, such as the Internet. However, it is important to note that the intrusion detection and prevention system in accordance with the invention may also be connected to any type of network using any underlying network protocols and is not limited to TCP/IP or Ethernet based networks.

The computer network includes an external router 110 coupled to a switch 115. The switch 115 is coupled to the intrusion prevention system 105 and to a firewall 170. The firewall 170 is also coupled to an internal network 180. The intrusion prevention system 105 is also coupled to a tracking module 175.

As shown in FIG. 1, the intrusion prevention system 105 includes a traffic sorter 130, an activity monitor 140, an inter-port fusion module 160, and an outcome director 165. In the embodiment of FIG. 1, the activity monitor 140 includes a cross-port module 142, a port Y intrusion prevention module 144, a port X intrusion prevention module 146 and an SMTP intrusion protection module 148. It is important to note, however, that the activity monitor 140 may include any number of dedicated port or activity monitors.

The intrusion prevention system 105 essentially acts as a sniffer on the network, gathering and processing a copy of all traffic going in and coming from the network. Assessment decisions formed by processing copied traffic are forwarded to either the existing firewall 170 or the external router 110, both of which are external to the intrusion prevention system 105.

Each of the monitors (the cross-port module 142, the port Y intrusion prevention module 144, the port X intrusion prevention module 146 and the SMTP intrusion prevention module 148) apply real-time automated assessment technology, as described in greater detail below, to process network activity and to differentiate intrusive from non-intrusive intent for respective targeted port activity.

In operation, data traffic arrives from the Internet 120 and leaves the computer network. The external router 110 routes data traffic to and from the computer network and the Internet 120. A firewall 170, also coupled to the intrusion prevention system 105, provides a barrier between data traffic and end users of a network, or subnet.

As shown in FIG. 1, the external router 110 routes inbound data traffic from the Internet 120 to the switch 115. The switch 115 copies the inbound traffic, transferring the copied information to the traffic sorter 130. The traffic sorter 130 receives the copied data traffic and forwards the traffic to the appropriate port activity module within the activity monitor 140. This directing function preprocesses and forwards port specific activity along with designated atomic level activity i.e, packet level activity, to the activity monitor 140. In general, the inbound data traffic is in the form of IP packets that are forwarded automatically by the external router 110 to the firewall 170 and are captured by the traffic sorter 130 in real time from the switch 115. The traffic sorter 130 uses layer 3 (network layer) and layer 4 (transport layer) header information to determine where to route the traffic. As will be described in greater detail below, the activity monitor 140 also carries out an assessment function, assessing the degree of intent to cause harm represented by a given user's activity.

The inter-port fusion module 160 combines assessment results across the port monitors 142, 144, 146 and 148 when more than one port monitor is used at any given time to track session behavior (individual activity). The inter-port fusion monitor 160, thus, generates a combined assessment and forwards a combined assessment result to an outcome director 165. The outcome director 165 outputs an instruction to block or track a user based upon combined assessment from the inter-port fusion monitor 160. The outcome director 165 is governed by a set of rules that determines whether a given assessment merits blocking or tracking. The outcome director 165 rules may be tuned to a given network so that the reaction to a given assessment can be varied.

The output from the outcome director 165 may be routed to either the tracking module 175, where the user's activities are tracked, or to the firewall 170, where the instruction to block access is acted on. The instruction to track a user is forwarded by the outcome director 165 to the tracking function 175, which serves as an evidence-gathering module. The determination to block or track a user with assessed harmful intent is pre-determined by a system administrator as a general default, or for a specific intruder. For example, if the need is to protect the network without exception, all intruders exhibiting assessed harmful activity will be blocked. If the purpose Is to gather evidence on intruders (or a specific intruder), all relevant activity, including assessed intent will be forwarded to a tracking module 175, where evidence of harmful intent and actual activity is gathered and stored. If activity at a current time cycle is not suspicious, it does not mean that an intrusion will not occur. Thus, while certain activity will not trigger a blocking or tracking action due to sub-threshold expertise and deception assessments, specified user activities will be continually tracked throughout a session and temporarily stored in the event that assessed threatening behavior occurs during subsequent time cycles later in the user's session.

One of the underlying principles of the intrusion prevention system 105 according to the invention is a recognition that a specific user's intent can change over time. Authorized traffic can quickly turn from authorized to unauthorized traffic or suspicious activity, which needs immediate attention to prevent damage to a targeted system. By constantly tracking all relevant port traffic by user, the intrusion prevention system 105 is capable of making assessment decisions in real time. Activity not targeted for the intrusion prevention system 105 detection is differentiated from the intrusion prevention system 105 targeted port activity by the traffic sorter 130 within the intrusion prevention system 105.

Figure 2:
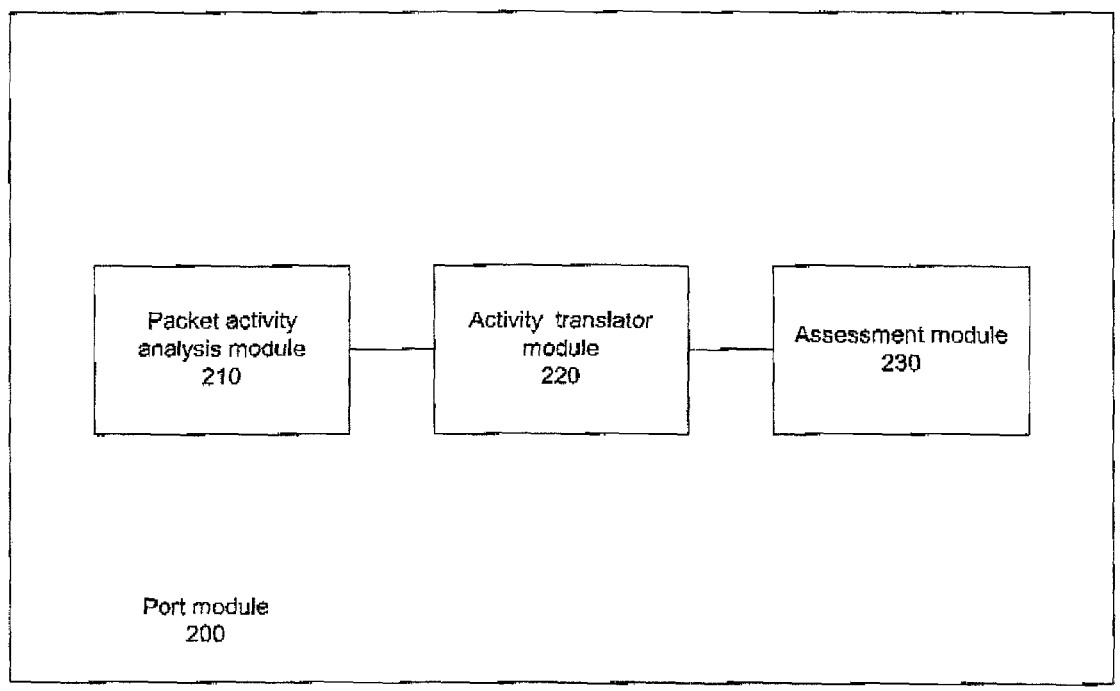
FIG. 2 is a block diagram illustrating a sample port module in accordance with an embodiment of the invention.

FIG. 2 shows a general port activity monitor module 200 in greater detail. It should be understood that while FIG. 2 shows a general port module 200, the discussion herein is equally applicable to any of the activity monitors discussed. As shown in FIG. 2, the sample port module includes a packet activity analysis module 210 coupled to an activity translator module 220 that is coupled to an assessment module 230. In operation, the packet activity analysis module 210 receives packet level information from the traffic sorter 130. The packet level analysis module 210 establishes a session for each user that is organized by source designation or activity. This is accomplished by processing layer 3 and layer 4 headers to pull out key information. Reassembly of packets is also accomplished to better determine activities to be monitored. Using the TCP sequence numbers, each session is monitored to track activities. With IP and UDP, more advanced methods incorporating the use of addresses, time, and other relevant information are used to differentiate activity of one user from the activity of another user. Activity is processed by parsing functions to identify designated port-specific activities to be monitored within the activity analysis module 210.

The activity translator module 220 receives input from parsers within the activity analysis module 210. The activity translator processes activity from a user and designates various activities as binary "1" if present and "0" if absent. For example, specific commands and activities used by an intruder and designated as activities to be tracked will be tracked and converted via a transducer function to a binary representation of the presence ("1") or absence ("0") of that activity in the activity translator module 220.

The activity translator module 220, as a centralized coordinating function, receives input from all transducer functions and forms a binary vector by user, which consists of a set of the combined 1's and 0's that correspond to the presence and absence, respectively, of all monitored activities for a user at a set time cycle. This vector information is then forwarded to the assessment module 230. As is described in detail below, the assessment module 230 generates an assessment for a given user of the network based upon the binary input information provided by the activity translator module 220. The assessment module is trained to convert activity information into an assessment rating.

Figure 3:
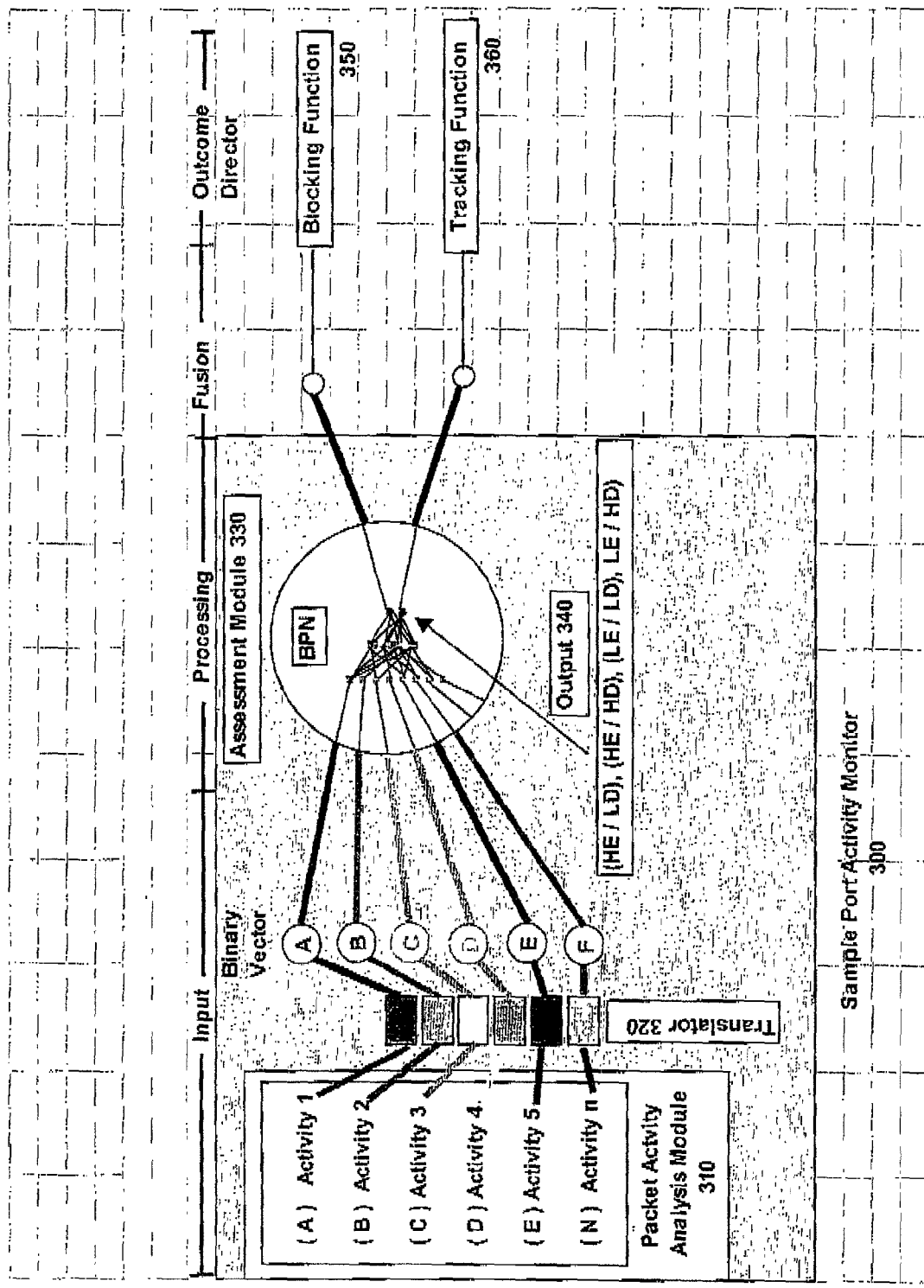
FIG. 3 is a block diagram of a back-propagation network (BPN) in accordance with the invention.

FIG. 3 shows the functionality of the intrusion prevention system 105 in accordance with an embodiment of the invention. FIG. 3 shows a sample port activity monitor 300, a packet activity analysis module 310, an activity translator module 320 and a back propagation network assessment module 330. The sample port activity monitor 300 monitors pre-set activities, such as specific commands used by intruders. As shown in FIG. 3 for illustrative purposes, the sample port activity monitor observes six, or any number of activities: activity 1, activity 2, activity 3, activity 4, activity 5, to activity N. In practice, many scores of activities may be monitored, depending on the port that is monitored.

The packet activity analysis module 310 and activity translator module 320 within each specific port monitor work sequentially to first identify monitored activities and to then translate the activities to "present" and "absent" binary format. The binary "present" and "absent" provide data from an input vector for the BPN assessment module 330. The BPN or assessment module 330 produces an accurate rating within each session for the single to multiple activities exhibited by a user and presented to the BPN 330 as input for that time cycle. This assessment provides, in real-time, a determination of expertise and deception represented by the combination of activities, even if the combination had not been previously encountered. Unlike current commercial systems, the BPN 330 automated assessment within the intrusion prevention system 105 can make a reliable determination of intent represented by a combination of activities within a packet or series of packets that has not been previously encountered as a specific combination. The BPN 330 provides outputs 340 that are based upon all of the behavioral information monitored by the sample port activity monitor 300. The BPN 330 essentially considers each and every type of specified activity monitored and generates a profile of the monitored user. This profile indicates whether a user is exhibiting harmful intent and should be blocked or tracked based on options set. If a user is not judged to be exhibiting harmful intent, he is considered to be "non-harmful." The outputs 340 are ultimately directed to either a blocking function 350 or a tracking function 360 based on decision criteria established by the system administrator.

The BPN is the foundation of the assessment module 330. The BPN is trained to recognize behavioral characteristics associated with each single monitored activity (antecedents). According to one embodiment of the invention, the BPN output may be represented as orthogonal X-Y coordinates formed by dimensions of deception and expertise. In an embodiment in which more than 2 dimensions are used, such as the addition of persistence and accuracy to deception and expertise dimensions, a hyperdimensonal region determination rather than an X-Y coordinate decision space is created. The assessment function is concluded with a categorization of the activity into one of several user intent classes determined by degree of deception and expertise present for that assessment cycle.

Each "single" activity rating for each dimension of deception and expertise for this embodiment of the invention is determined by an expert panel trained in intrusion techniques, as well as information gained from the study of actual intrusions and from the current literature. Whereas it is possible to determine dimension ratings for one single activity at a time along one dimension at a time, it is exceedingly difficult for human experts to rate multiple activities occurring simultaneously across more than one dimension. Therefore, a methodology that can use single activity ratings along combined and orthogonal dimensions to produce accurate ratings for multiple activities, even if not previously encountered, is a hallmark of the intrusion prevention system neural network assessment function.

More specifically, an input vector representative of behavior is processed by the trained BPN 330 with its output 340 designated as behavioral ratings across expertise and deception domains. For any given input element, the BPN 330 returns an output indicating the degree of expertise and deception represented by the presence of that specific activity. To be more precise, specific network activities are viewed as antecedents to intent that may be manifested as intrusion or non-intrusion behaviors. Given the presence of a specific monitored activity, or combination of monitored activities, the BPN 330 returns an assessment and a determination of the intent and deception that are most likely associated with the activity. The assessment functions are ultimately monitored by a blocking function 350 and a tracking function 360 within the outcome director 165 (depicted in FIG. 1). The purpose of these functions is to forward respective block or track decisions to the firewall 170 or tracking module 175, respectively.

Figure 4:
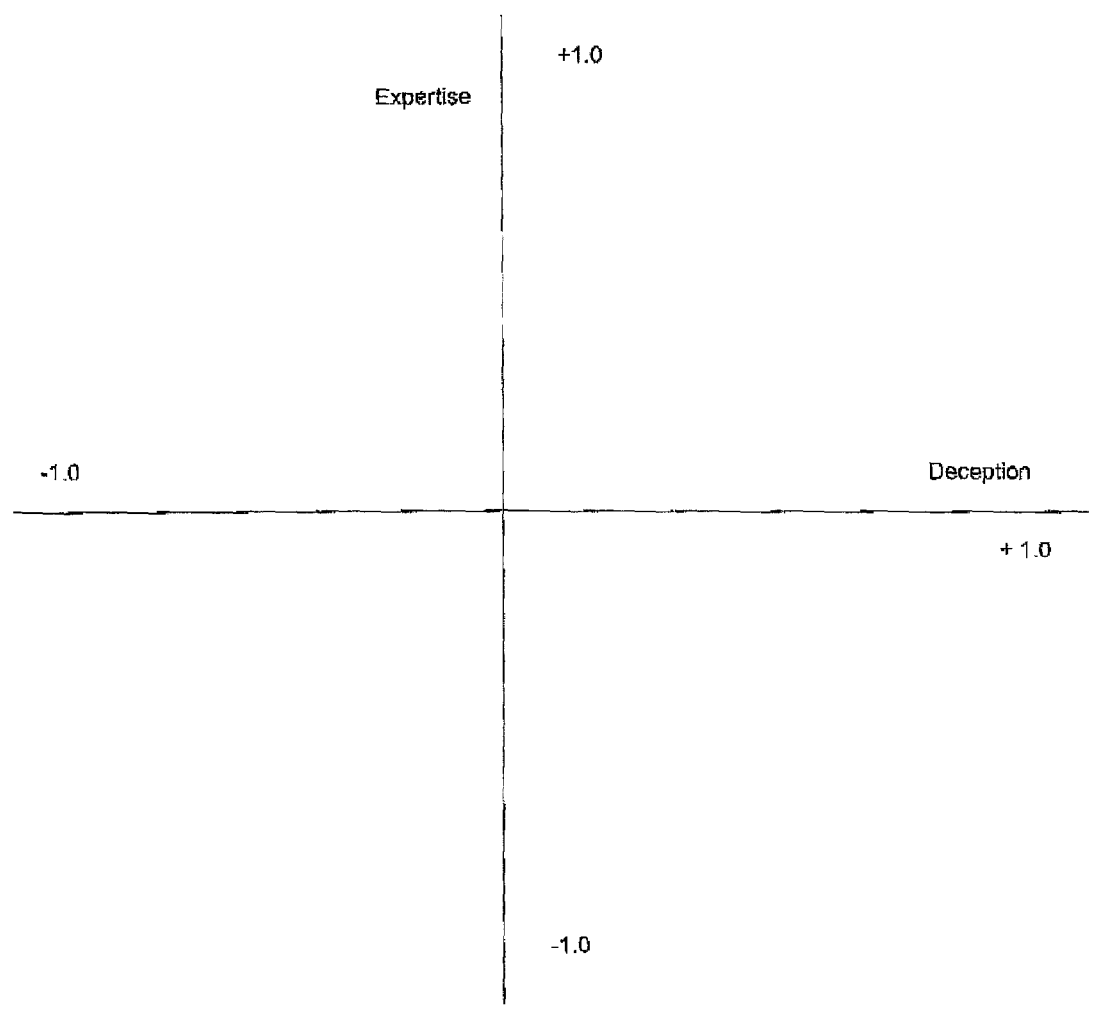
FIG. 4 is a two dimensional grid illustrating the neural network automated assessment ratings.

Combinations of monitored activity across the BPN input layer return an overall accurate assessment of these characteristics, even if the combinations have not been previously encountered. As a last step, the BPN ratings are superimposed on a conceptual grid whereby expertise and deception dimensions are orthogonal. The grid coordinates create four cells: high deception-high expertise (HD/HE), high deception-low expertise (HD/LE), low deception-high expertise (HD/HE), and low deception-low expertise (LD/LE). FIG. 4 shows an example of a two dimensional grid in accordance with the invention. The grid provides a view of assessed behavior in an ongoing manner if a user's activity is selected for manual monitoring, or if activity from a user is selected for viewing automatically as a result of the user exhibiting suspicious behavior as defined by expertise and deception ratings of ongoing activity. Simultaneously, the BPN output, through the outcome director, is automatically monitored for decision determination by the blocking function 350 and the tracking function 360. The BPN ratings may be mapped in real-time using the grid shown in FIG. 4 so that a network administrator could monitor behavior over time.

The BPN 330 shown in FIG. 3 represents one of many possible BPNs. A single BPN monitors the activities of a specific user for specific port-related activity. Other BPNs assessing input data in real-time within designated port activity monitoring components operate in an identical manner. Each BPN input layer element corresponds to one monitored activity. The trained BPN on a time-cycled and repeated basis processes activity represented across the input layer. For example, in FIG. 3, for illustrative purposes, the input layer is represented by circled A, B and E input elements. This represents an input layer whereby these three multiple activities are active within a time cycle and have received designations of "1" while all other input elements representing an absence of activity have received a "0." It is important to note that, in practice, a single BPN may have scores of input elements representing scores of activities being monitored and converted to 1's and 0's for BPN assessment.

The BPN process, which consists of receiving binary input and producing an assessment output, is almost instantaneous. This real-time process occurs for any single to multiple activites represented at the BPN's input layer for that particular time cyle. The assessment result takes, the form of a scoring decision across four quadrants created by the intersection of dimensions of expertise and deception, For this particular example, the four quadrants are: high deception-high expertise [HD/HE], high deception-low expertise [HD/LE], low deception-high expertise (LD/HE), and low deception-low expertise [LD/LE]. Immediately following the determination of harmful intent, specific functions 350 and 360 process the BPN output to determine if each respective function should emit an active output instruction.

In this example, if the assessment via the fusion module places the activity of the user into the high deception-high expertise category, the blocking function 350 will initiate an instruction to block the user from entry or will terminate the session. In cases where evidence gathering is required and set as an option (as opposed to blocking for HD/HE or LD/HD activity), the tracking function 360 will initiate a tracking instruction to the tracking module 175 to save the user activity to a special file and/or direct the user to a honeypot or similar functions.

It is important to note that decision boundaries for tracking and blocking are distinct and allow maximum flexibility across these two decision areas via options that can be set by a system administrator. For example, options may be set to track users exhibiting behavior across the three quadrants not exhibiting the highest expertise and deception ratings and block all users whose activity reaches the upper right quadrant represented as high expertise and high deception. Any combination of tracking and blocking actions can be adjusted via quadrant thresholds. To illustrate with another example, the administrator may choose to not conduct tracking by setting tracking thresholds off and only block users whose activity reaches the high expertise and high deception quadrant. Actual disposition (e.g., block or track) is adjustable via threshold rules and can be determined by a system administrator to meet idiosyncratic security needs.

It is also important to note that regardless of tracking and blocking options, an individual user is tracked by session continuously until either the user is blocked (session terminated as a result of activity exceeding harmful intent thresholds) or the user terminates his connection. Continuous session monitoring is based on the premise that harmful intent may not be exhibited immediately by expert hackers and occur later in a session.

The assessment results, as well as other specifics such as time, etc., are saved to a database. In the event that a user is determined to be exhibiting harmful intent, his/her session data are sorted and filed in such a manner that the assessment information and associated data represent an intrusion profile for that specific intruder. Such automatically generated profiles are used to check against active session data to assist in the determination that an identified intruder may be attempting access again by exhibiting similar patterns of activity, although a different source address may be used. It is assumed that although source identification may change, activity patterns represented by expertise and deception assessments, as well as supportive information such as time, etc. are more stable.

The neural network pattern classification function is not limited to a BPN but may incorporate other neural network systems, as well as multidimensional statistical procedures. Likewise, the characteristics used for assessment are not limited to expertise and deception dimensions. Characteristics such as persistence and accuracy, among others, are useful as antecedent assessment dimensions, as well.

FIG. 5 illustrates the process for detecting and preventing unauthorized network intrusions in accordance with an embodiment of the invention. In FIG. 5, the process begins with step S510 wherein incoming traffic is received. The process then moves to step S520.

In step S520, the system uses information in the IP packets and port specific TCP and UDP packets to determine where to route the traffic. The process then moves to step S530.

In step S530, the system filters the routed information, establishes a session by user (source address), determines the presence or absence of specific monitored activity at the packet level and assigns the activity binary representations with a "1" indicating the presence of a specific monitored activity and a "0" indicating the absence of a specific monitored activity. The process then moves to step S540.

In step S540, the system conducts an assessment of the activity utilizing the assessment module or BPN as described above. The process then moves to step S550. In step S550, the system fuses the results from the assessment agent for respective port monitors if sessions are apparent across port monitors. If no other sessions have been established, then the assessment for the single port monitor proceeds and no combining of results is needed. The process then moves to step S560 and S580 simultaneously.

In step S560, the system determines whether the activity should be tracked based on tracking thresholds and in step S580 the system determines if the user's access should be blocked based on blocking thresholds. Blocking or tracking is mutually exclusive and established by adjustable thresholds by a system administrator. If in either steps S560 or S580, the system determines that the activity should not be tracked or blocked, then the process moves to stop S595 and continues until such time that the user terminates the session him or herself or until the user's activity becomes threatening. If in step S560 the system determines that the activity should be tracked, the process moves to step S570.

In step S570, the system stores the tracking related information as a means to establish evidence of intrusive behavior in a specialized tracking database. If in step 580 it was determined that the user's access should be terminated, the process moves to S590. In step S590, the system initiates a blocking instruction to the firewall 170, all information is stored in a blocking database, and the intruders connection is terminated automatically. From step S595, the process moves to step S597 where the process stores the session information in a session storage database.

It is important to make distinctions among three database functions. First, a session database may be provided whereby a user's activities and ratings are stored to allow tracking of expertise and deception repeatedly for the duration of a session Second, a tracking database may be provided whereby specialized evidence gathering data based on transferred session data are stored and which may be used to provide "proof" of a specific intruder's activities once a tracking decision has been made. Third, a blocking database may be provided that stores all relevant information generated in the session database that provides the sequence of events and ratings leading to the loss of access for a user. Unless an automated decision based on tracking or blocking criteria is made to store session and related data or unless the system administrator wishes to store expertise and deception profiles of non-harmful users, the session database is cleared for a user when the user exits the network.

While specific embodiments of the invention have been described herein, it will be apparent to those skilled in the art that various modifications may be made without departing from the spirit and scope of the invention.

The invention claimed is:

1. A method for detecting unauthorized intrusion in a computer network, comprising the steps of:
   copying packets that are being transmitted in real-time over the computer network;
   sorting the copied packets based on port type;
   sending packets of a particular port type to one or more port modules, each port module being designed for processing packets of a single port type;
   processing packets with each port module by reviewing and comparing information from various parts of each packet;
   determining a presence and absence of port-specific activities based on each packet with each port module;
   generating binary vectors representing the presence and absence of port-specific activities based on each packet with each port module;
   assessing each binary vector and determining a level of expertise and deception for the port-specific activities represented by the binary vector with each port module;
   outputting a behavioral rating from each port module in real-time based on the assessing and determining steps, the behavioral rating comprising at least two dimensions of deception and expertise.

2. The method of claim 1, further comprising combining behavioral ratings from a plurality of port modules.

3. The method of claim 1, further comprising determining if a threshold for a behavioral rating has been exceeded.

4. The method of claim 3, wherein if the threshold for a behavioral rating has been exceeded, then blocking user activity.

5. The method of claim 3, wherein if the threshold for a behavioral rating has been exceeded, then initiate a tracking of user activity.

6. The method of claim 1, wherein outputting a behavioral rating in real-time based on the determining step further comprises outputting a behavioral rating comprising at least one of a persistence and accuracy dimension.

7. The method of claim 1, further comprising mapping the behavioral rating on at least one two-dimensional grid.

8. The method of claim 1, further comprising generating a profile a user based upon monitored behavioral measures.

9. The method of claim 1, wherein the step of assessing each binary vector and determining a level of expertise and deception is carried out utilizing a back propagation network.

10. The method of claim 9, wherein the back propagation network includes psychological assessment information.

11. The method of claim 1, wherein the behavioral rating comprises one of high deception/high expertise, high deception/low expertise, low deception/high expertise and low deception/low expertise.

12. The method of claim 4, wherein the blocking user activity comprises sending a blocking command to a firewall for blocking further network access.

13. The method of claim 4, wherein blocking user activity comprises a loss of a connection between a user and the computer network and storage of all relevant session data up to the point of forced loss.

14. The method of claim 5, wherein tracking of user activity comprises storing activity information in a database that may be used to provide evidence of an intruder's harmful intent activities.

15. A system for preventing unauthorized intrusion in a network system, comprising:
   a traffic sorter for sorting copied packets based on port type;
   an activity monitor operatively coupled to the traffic sorter, the activity monitor comprising a plurality of port modules, each port module being designed for processing packets of a single type and processing packets by reviewing and comparing information from various parts of each packet and determining a presence and absence of port-specific activities based on each packet, each port module outputting a behavioral rating in real-time based, the behavioral rating comprising at least two dimensions of deception and expertise;
   an inter-port fusion module operatively coupled to the activity monitor for grouping behavioral ratings received from the port modules of the activity monitor; and
   an outcome director operatively coupled to the inter-port fusion monitor that determines whether to block or track user activities based upon the behavioral ratings received from the inter-port fusion module.

16. The system of claim 15, wherein each port module generates binary vectors representing the presence and absence of port-specific activities based on each packet.

17. The system of claim 16, wherein each port module assesses each binary vector and determines a level of expertise and deception for the port-specific activities represented by the binary vector.

* * * * *